April 13, 1965  G. B. ANDERSON ETAL  3,177,743
AXLE LATHE
Filed Aug. 16, 1962   5 Sheets-Sheet 1
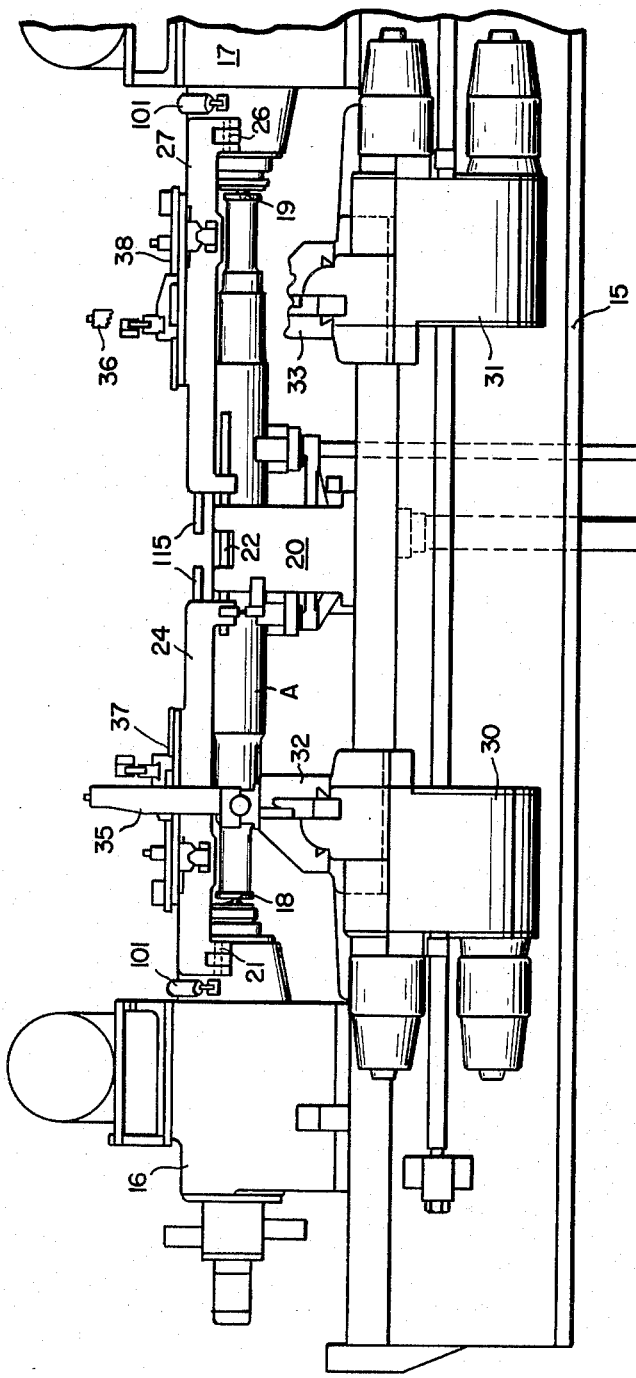
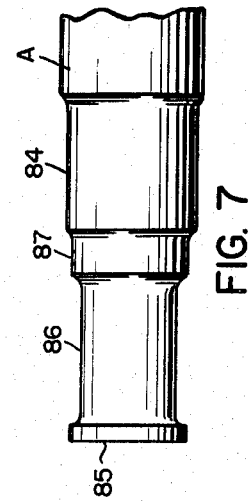
INVENTORS
GEORGE B. ANDERSON
WILLIAM R. MILLER
BY
ATTORNEY

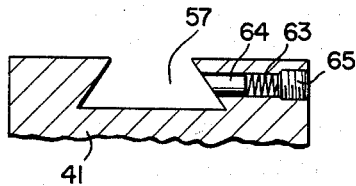
FIG. 5
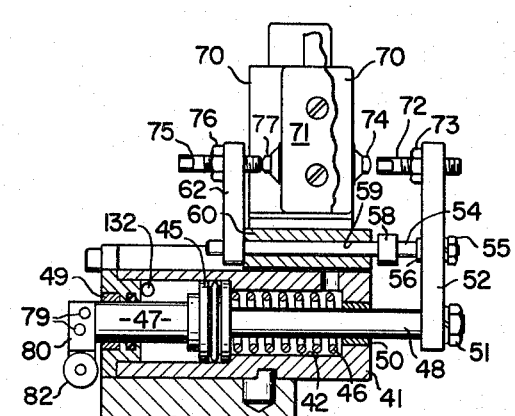
FIG. 2
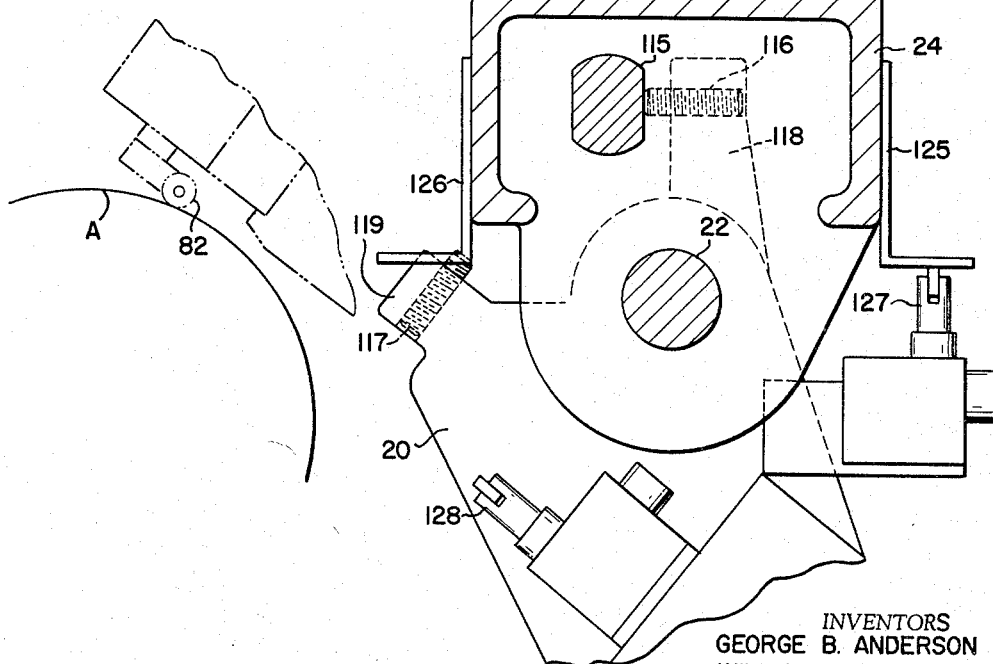

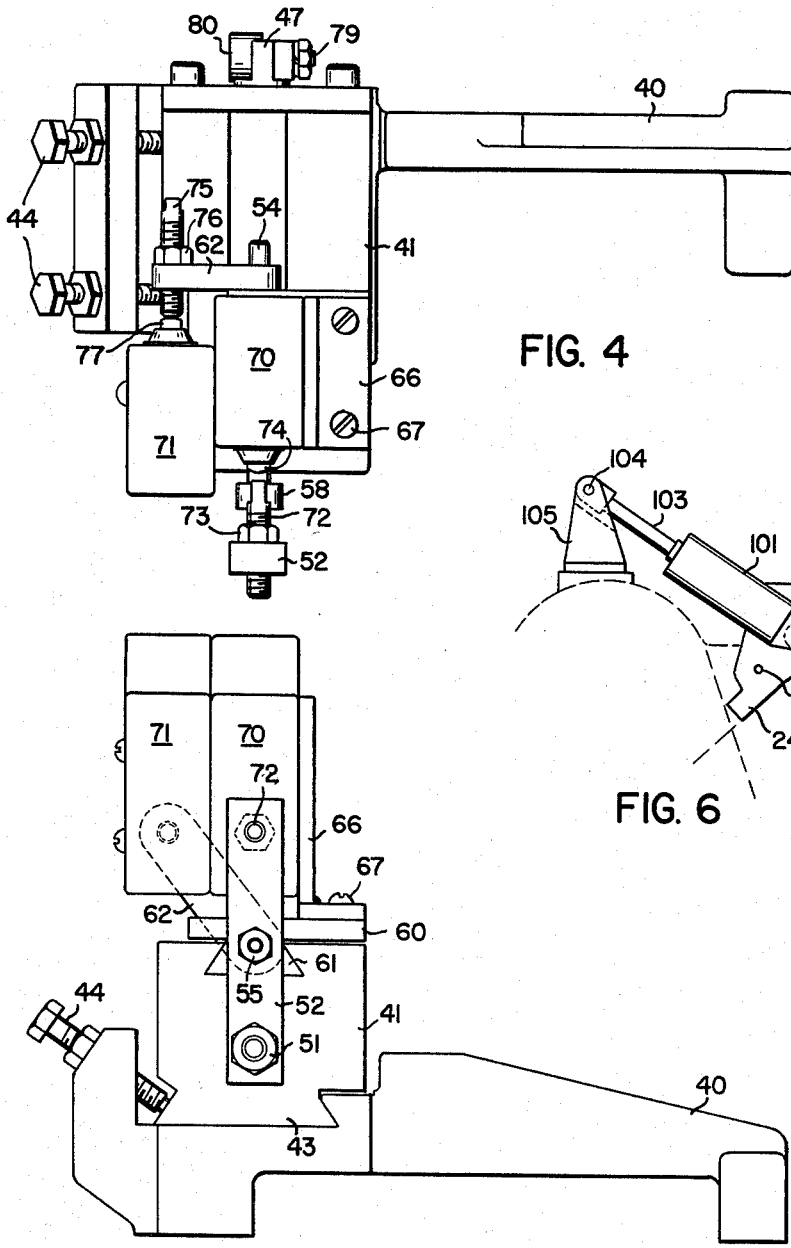

April 13, 1965   G. B. ANDERSON ETAL   3,177,743
AXLE LATHE
Filed Aug. 16, 1962   5 Sheets-Sheet 4
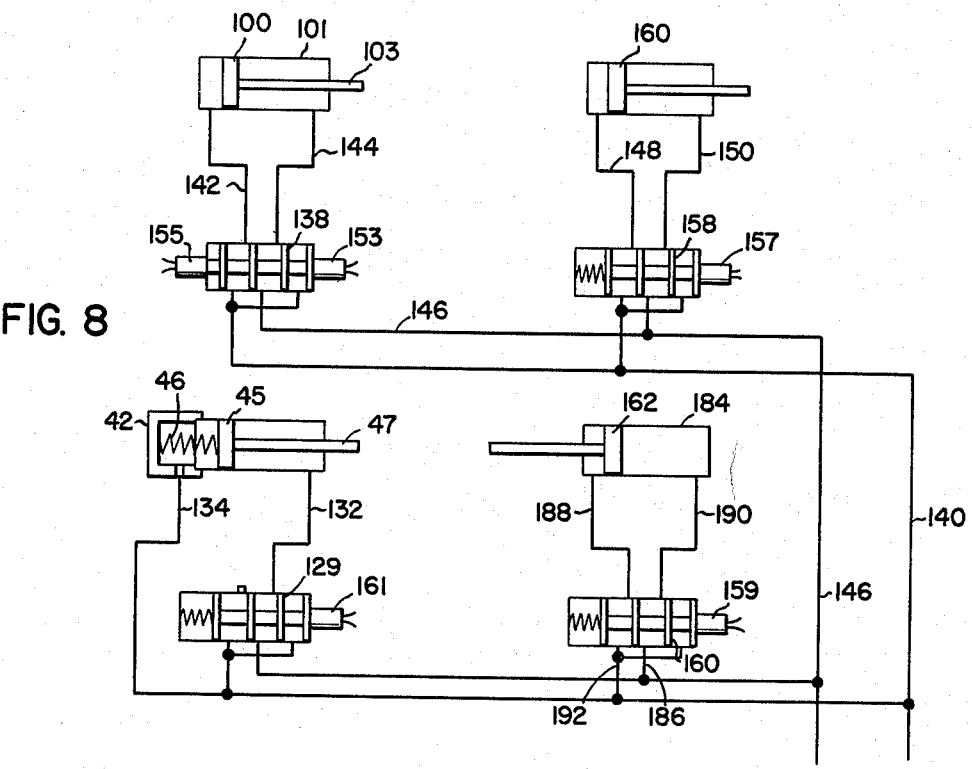
FIG. 8
FIG. 9
INVENTORS
GEORGE B. ANDERSON
WILLIAM R. MILLER
BY
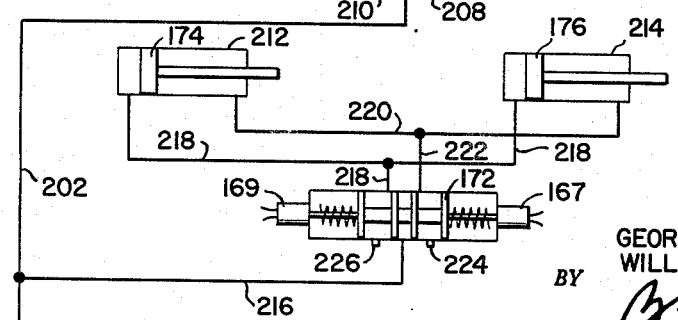
ATTORNEY

United States Patent Office

3,177,743
Patented Apr. 13, 1965

3,177,743
AXLE LATHE
George B. Anderson and William R. Miller, Rochester, N.Y., assignors to Consolidated Machine Tool Division of Farrel-Birmingham Company, Inc., Rochester, N.Y., a corporation of Connecticut
Filed Aug. 16, 1962, Ser. No. 217,374
16 Claims. (Cl. 82—8)

The present invention relates to machine tools, and more particularly to an automatic machine for turning railroad car axles, that is, to an axle lathe.

In the copending application of William R. Miller, Frederic William Young and Peter Hold, Serial No. 193,895, filed May 2, 1962, now Patent No. 3,079,822 patented March 5, 1963, there is disclosed an axle lathe which will take an axle, position it between centers, then swing supports, on which templates and probes are mounted, down into position to position the probes in operative relation with the axle. The sensing members or probes and the templates are secured together so that the probes by engagement with the axle will position the templates. The sensing members or probes and the templates are mounted on a base or slide that is moved radially toward the axle under hydraulic pressure, after the support has swung the probes into operative relation with the axle, to position the probes, and thereby to position the templates, so that a predetermined amount of material will be machined off the bearing surfaces of the axle in a subsequent machining operation. There are two sets of probes, one for each end of the axle; but since the two sets are identical, only one need be referred to here in detail. Each set of probes comprises four probe members which are arranged in two pairs. The two probes of each pair are movable toward and away from one another axially of the axle. Two of these probes are adapted to engage, respectively, the end shoulder at one end of the axle and the radius or fillet at the juncture of the bearing fit or journal and of the dust guard or fit; and these two probes are automatically moved apart by pneumatic pressure until they engage both these parts of the axle. The other two probes are adapted to engage the radius of fillet at the juncture of the dust guard and the wheel fit, and the radius or fillet at the juncture of the wheel fit and the main body of the axle, respectively; and they are moved apart by pneumatic pressure until both are stopped by engagement with their respective radii or fillets. Secured to each of the probes is a removable template which is intended to control the machining of that portion of the axle which is engaged by the respective probe. When the probes are positioned by engagement with the respective parts of the axle, the templates are therefore simultaneuosly adjusted into their proper positions for control of the subsequent machining operations.

After the probes have sensed their respective portions of the axle, and been positioned thereby, they are locked in adjusted positions by hydraulic pressure. Then the probe-template supports are automatically swung out of engagement with the axle back to their starting positions thereby carrying the now-adjusted templates into position to be engaged by tracers. When they reach this position, the motors, which rotate the centers, on which the axle is mounted, and which actuate the feed drives for the carriages and cross slides of the lathe, are put into operation. The tracers are mounted on the cross slides, which carry the tools, and the cross slides in turn are mounted on the carriages so that as the work rotates and the carriages and cross slides move, the tracers will follow the templates and cause the tools to produce the desired shape on the work.

The machine of the application referred to is designed to remove a definite amount of stock from an axle in order to reclaim the axle. It is not intended to machine the journal portions of the axle down to the specific size.

In some cases, the journal portion to be reclaimed may be eccentric, and may be so eccentric, in fact that it is not reclaimable, it will not clean up completely during removal of the predetermined amount of stock from the high side of the journal portion.

One object of the invention is to provide appartus which will test an axle, when it is positioned in a machine such as disclosed in the application above-mentioned, to determine whether or not it is too eccentric to be reclaimable.

Another object of the invention is to provide apparatus of the character described, which will automatically stop the machine if the eccentricity of the axle exceeds predetermined limits, and reject the axle.

Another object of the invention is to provide apparatus of the character described which will be of simple construction, and simple in operation.

Other objects of the invention will be apparent hereinafter from the specification and from the recital of the appended claims when considered in connection with the accompanying drawings.

In the drawings:

FIG. 1 is a fragmentary front elevation of a machine built according to the invention of the above-mentioned pending patent application and incorporating the improvement of the present invention;

FIG. 2 is an end elevation on an enlarged scale of the template carrier of the machine showing mounted thereon an eccentricity probe constructed according to one embodiment of this invention, parts being broken away to show the construction of the eccentricity probe, the probe being shown fragmentarily also in dotted lines in operative position relative to an axle;

FIG. 3 is a front elevation of the eccentricity probe;

FIG. 4 is a plan view thereof;

FIG. 5 is an enlarged fragmentary sectional view showing the guideway for the slide which carries the probe;

FIG. 6 is an end elevation showing particularly the means for swinging the probes and templates between sending and tracing positions;

FIG. 7 is a fragmentary side elevation of an axle such as may be turned on a machine built according to the illustrated embodiment of the invention;

FIG. 8 is a diagram showing the hydraulic circuit for the machine;

FIG. 9 is a diagram of the pneumatic circuit of the machine; and

Figure 10:
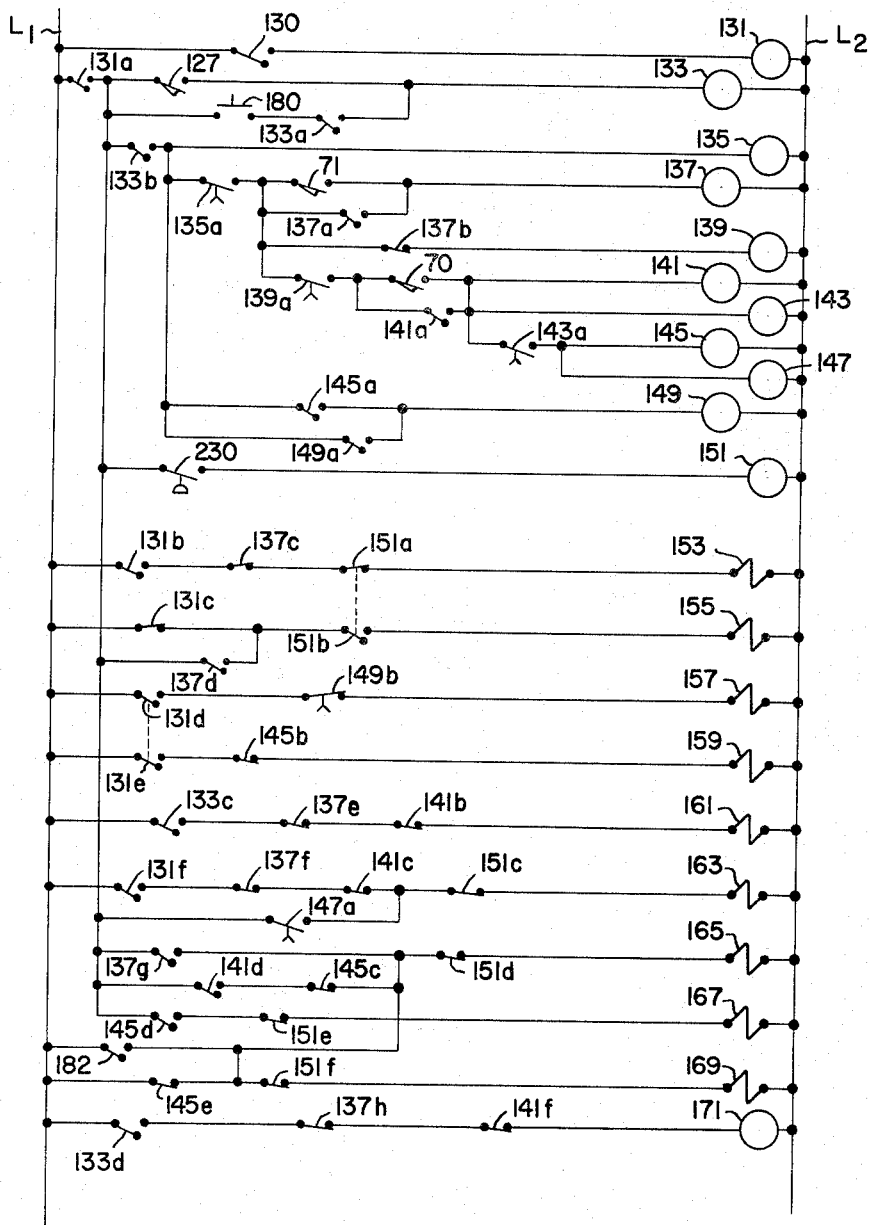
FIG. 10 is an electric diagram illustrating how the machine may be wired to perform its functions.

Referring now to the drawings by numerals of reference, 15 denotes the bed of the machine. Mounted upon the bed 15 is a left-hand spindle head 16 and a right-hand spindle head 17. The axle A, which is to be machined, is mounted between centers 18 and 19 carried by these heads.

Secured to the bed 15 to project upwardly therefrom at one side thereof is a bracket 20. Pivotally mounted at one end on the head 16 by means of a pivot pin 21 and at its opposite end on the bracket 20 by means of a pivot pin 22 is a beam or support 24 which carries the probes and the templates for controlling amount of stock to be removed from and the shape to be turned on the axle at one end thereof. Pivotally mounted at one end on the head 17 by means of the pivot pin 26 and at its opposite end on the bracket 29 by means of the rod 22 is a support 27 which carries the probes and templates for controlling the shape to be turned on the axle at its opposite end. The supports 24 and 27 are substantially identical; and therefore reference will only be made to the support 24 and the parts carried thereby hereafter.

Reciprocal on the bed 15 are the carriages 30 and 31. These carry the cross slides 32 and 33, respectively, on which the tools (not shown) for turning the axle at its opposite ends, respectively, are mounted, and on which are also mounted the tracers 35 and 36 which engage the two sets of templates 37 and 38, respectively, to control the tool operations. The tracer 36 is shown only fragmentarily.

All of the above-described parts are like those described and illustrated in application Ser. No. 193,895 above-mentioned, and reference may be had thereto for a more detailed description thereof.

Mounted on each of the template carriers is an eccentric probe mechanism such as shown in FIGS. 2 to 5 inclusive. This mechanism includes a base 40, which is mounted on top of the template carrier and on top of which there is secured a block 41 that is bored to form a cylinder 42. The block 41 has a dovetailed shaped foot 43 which engages in a correspondingly shaped groove in base 40, and which is held therein by set screws 44.

A piston 45 is mounted to reciprocate in the cylinder 42. The piston is constantly urged in one direction in the cylinder by a coil spring 46. It is moved in the opposite direction by hydraulic pressure. The piston has piston rods 47 and 48 projecting from opposite ends thereof and extending out through the end walls of the cylinder 42 through packings or sealing members 49 and 50. Secured to the projecting end of the piston rod 48 by a nut 51 is a strap 52. Mounted in this strap 52 in parallelism with the piston rod 46 is a rod 54, which is secured against movement relative to the strap by a nut 55 and split washer 56. Mounted on the rod 54 for adjustment axially thereof is a stop collar 58.

The rod 52 extends through a bore 59 in a slide 60, and carries at the end opposite that where it is attached to the strap 52, a strap 62.

The slide 60 has a dovetailed foot portion 61 (FIG. 3), which is slidable in a correspondingly-shaped way 57 (FIG. 5) of block 41. Slide 60 is frictionally held against movement in the way 57 by a compression spring 63 (FIG. 5) and a friction plug 64 which is constantly urged by the spring 63 into engagement with one side of the dovetail guide portion 61 of the slide. A setscrew 65, which is threaded into the block 41, serves to adjust the compression on the spring 63.

Mounted on the slide 60 and secured thereto by screws 67 is an L-shaped bracket 66 (FIG. 3) to which there are secured in abutting relationship two limit switches 70 and 71. These limit switches face in opposite directions. Adjustably threaded into the strap 52 is a stud 72 which is secured to the strap by a nut 73 (FIGS. 2 and 4). The stud is positioned to engage the button 74 of the limit switch 70 to trip this limit switch.

The strap 62 extends diagonally; and threaded into it is a stud 75 which is secured to the strap in any adjusted position by the nut 76. Stud 75 is positioned to trip the limit switch 71 by engagement with the button 77 of that limit switch.

Secured by screws 79 to the projecting end of the piston rod 47 is an arm 80, on the free end of which there is journaled a roller 82. This roller is adapted to engage the peripheral surface of the wheel seat portion 84 (FIG. 7) of an axle as a probe to test its eccentricity as will be described further hereinafter. 85 denotes an end shoulder of the axle; 86 designates a bearing fit section; and 87 indicates a dust guard section.

Each of the probe and template carriers 24, 27 is swung about its respective pivot by application of hydraulic pressure to a piston 100 which reciprocates in a cylinder 101 (FIGS. 8 and 6). The piston has a rod 103 secured thereto which projects at one end through one end wall of the cylinder and is pivotally connected by means of the pin 104 to a bracket 105 which is secured on top of the head 16 or 17 as the case may be. The cylinder itself has a lug 107 integral therewith and secured thereto which is pivotally connected by means of the pin 108 with a bracket 109 that is fastened by means of screws (not shown) to the associated probe-template carrier 24 or 27.

Swinging movement of the template carrier is limited in opposite directions by engagement of a bar 115, which is secured to each template carrier, with one or other of two adjustable stops 116 and 117. The bar 115 is slabbed off on opposite sides, as shown in FIG. 2; and the stops 116 and 117, respectively, engage these slabbed off portions of the bar as the template carrier swings from setting position, where the probes engage the axle and set the templates, to operating position, where the templates are engaged by the tracer, and vice versa. Stops 116 and 117 are threaded, respectively, into lugs 118 and 119, respectively, that are integral with or secured to the bracket 20. Fastened to the carrier at opposite sides thereof are two L-shaped angle brackets 125 and 126. These are adapted, respectively, to trip two limit switches 127 and 128. The limit switch 128, when tripped, starts the probing cycle of the machine.

In the operation of the machine when equipped with the eccentricity probe of the present invention, the axle is chucked between centers as described in application Ser. No. 193,895 above mentioned. This causes the probe-template carriers to be swung down into probing position in the same way as described in said application. With the apparatus of the present invention, however, the swinging of the probe carrier into probing position trips a timer so that the axle makes approximately two revolutions. At the same time that the timer is tripped, the valve 129 (FIG. 8), which controls the position of the piston 45 (FIGS. 2 and 8), is shifted by means to be described hereinafter to cause the hydraulic fluid to be exhausted from cylinder 41 through duct 132, permitting the spring 46 to push the roller 82 into position to engage the wheel seat portion 84 (FIG. 7) of the axle A as the axle revolves. As the piston 45 moves forward it carries with it the strap 52 (FIG. 2) which causes the collar 58 to move forward also. After the collar has moved forward far enough to engage slide 60, it moves the slide 60 forward with it also. If strap 52 moves forward far enough, as when the eccentricity of an axle is within acceptable limits, stud 72 will trip limit switch 70.

On the second revolution of the axle, if the wheel bearing portion of the axle is eccentric, the roller 82, by reason of its engagement with the axle, will cause the piston rod 47 to be pushed inwardly in cylinder 42 against the resistance of spring 46, but the slide 60 is held by the friction exerted by plug 64 (FIG. 5) and spring 63 in the position to which it was previously pushed forward, unless the eccentricity of the axle exceeds a predetermined amount, determined by the adjusted position of stop collar 58 on rod 54 (FIG. 2).

If there is excessive eccentricity the piston 45 will be moved back far enough for trip member 75, which is connected to the piston by strap 62, rod 54 and strap 52, to trip limit switch 71 causing the axle to be rejected as hereinafter described. If the eccentricity of the axle is within acceptable limits, then, after the timer has timed out, the rotation of the axle will be stopped, the hydraulic motive fluid will be supplied to the front face of piston 45 through duct 132 (FIGS. 2 and 8) and the piston 45 will be moved rearwardly in cylinder 42 to withdraw the roller 82 from engagement with the axle; and the usual probing operation for setting the templates will start; and the operation will proceed as described in prior application Ser. No. 193,895. Line 134 (FIG. 8) from cylinder 42 is merely for exhausting any fluid which may leak past piston 45.

One way in which the machine may be wired to accomplish its purpose is illustrated in FIG. 10. 130 denotes the switch which is closed after the axle has been centered as described in application Ser. No. 193,895. When this is closed, a circuit is closed to the relay coil 131 from the main line L₁ through the closed switch 130 to the main line L₂.

Energization of the relay coil 131 closes the arms 131a and 131b associated with this relay coil, opens the arm 131c associated with this relay coil, and closes the arms 131d, 131e and 131f associated with this relay coil.

Opening of the arm 131c breaks the circuit to the solenoid 155, which effects movement in one direction of the valve 138 that, when shifted in that one direction, causes movement of piston 100 (FIGS. 6 and 8) in a direction to effect movement of the probe-template carriers to tracing position.

Closing of the relay arm 131b closes the circuit to the solenoid 153 from main line L₁ through closed relay arm 131b, the normally closed contact 137c associated with relay coil 137, and the normally closed contact 151a associated with relay coil 151. This causes valve 138 to be shifted to the right from the position shown in FIG. 8, putting the left hand end of cylinder 101 on supply from line 146 (FIG. 8) through line 142 and putting the right hand end of this cylinder or exhaust through lines 144 and 140. This causes the probe-template carrier to be swung into probing position, where it contacts and closes limit switch 128 (FIGS. 2 and 10).

Closing of the relay arm 131d closes a circuit from main line L₁ through the now-closed arm 131d, the normally closed time delay switch 149b, and the solenoid 157, to the main line L₂. The solenoid 157, when thus energized, shifts the valve 158 (FIG. 8) which controls the position of the piston 160 that effects clamping and unclamping of the probe-template carrier, as described in the pending application above-mentioned. This valve is shifted from the position shown in FIG. 8 to put the line 148 on supply from line 146 and to put the line 150 on exhaust through line 140. This causes the probes and templates to be unclamped as described in said pending application.

Closing of the relay arm 131e closes a circuit from the main line L₁ to the main line L₂ through the closed relay arm 131e, the normally closed relay arm 145b, and the solenoid 159 (FIGS. 8 and 10). This causes the valve 160 to be shifted to the right from the position shown in FIG. 8, causing the left hand of the cylinder 184 to be put on supply from line 146 through lines 186 and 188, and the right hand end of this cylinder 184 to be put on exhaust through the ducts 190, 192 and 140. This causes the template probe to be moved to cocked position as described in the application mentioned.

Closing of the relay arm 131f closes a circuit from main line L₁ through the now-closed arm 131f, the closed arm 137f of a relay coil 137, the closed arm 141c of a relay coil 141, and the closed arm 151c of a relay coil 151, energizing the solenoid 163. This causes the probes to be moved apart longitudinally, as described in the prior application mentioned, to bring the probes into abutting relation with the respective parts of the axle with which they are intended to engage as described in said prior application. Energizing of solenoid 163 shifts valve 164 to the right from the position shown in FIG. 9 putting the left hand ends of cylinders 196, 198 and 200 on supply from a compressed air supply through lines 202 and 204 and putting the right hand ends of these cylinders on exhaust through lines 206 and port 208. Solenoid 163 shifts valve 164 (FIG. 9) in one direction. Solenoid 165, when energized, shifts valve 164 in the opposite direction.

The closing of limit switch 127 closes the circuit to the relay coil 133. This closes the arms 133a, 133b, 133c and 133d of this relay.

The closing of relay arm 133a enables a circuit to be made to relay coil 133 at any time, so long as relay arm 131a remains closed, by pressing in button 180. This permits reprobing, that is, retesting the axle for eccentricity.

The closing of the relay arm 133b closes the circuit to a conventional timer 135 which may be of any suitable construction. This timer determines, as described above, in part the time during which the roller 82 remains in operative relation to the axle, that is, the number of revolutions for the eccentricity test on the axle.

The closing of relay arm 133c establishes a circuit to the solenoid 161 from the main line L₁ through the now-closed relay arm 133c, the closed relay arm 137e and the relay arm 141b. This causes the pressure fluid to be exhausted from the front end of the cylinder 42 (FIGS. 8 and 2) allowing the spring 46 to move the piston to the left in FIG. 2 and bringing the roller 82 into engagement with the wheel bearing portion of the axle.

The closing of relay arm 133d starts the inching motor, which is denoted generally at 171, starting this motor to drive the centers which carry the axle.

Closing of the limit switch 128 therefore starts the inching motor, energizes the solenoid 161, causing the roller 82 to be moved into testing position, and energizes the timer coil 135. When the inching motor is started the work spindle of the machine is rotated at approximately 9 r.p.m. for approximately 2½ revolutions, allowing the eccentricity probe 82 to set itself to the low point. This time is controlled through the timer 135.

The front end of the cylinder 42 (FIG. 2) is put on exhaust at the time the timer 135 is tripped. The spring 46 therefore pushes the roller 82 into engagement with the wheel seat 84 (FIG. 7) of the axle, the piston rod 48 moving forward toward the axle and carrying the collar 58 with it. The collar pushes the slide 60; and the stud 72 trips the limit switch 70. Nothing happens on the first revolution of the axle.

When the timer 135 times out, the arm 135a of this timer closes. This closes a circuit to another conventional timer 139 which may be of any suitable construction, the circuit being made through contact 135a, and normally closed relay arm 137b associated with relay coil 137. On the second revolution of the axle the roller 82 (FIG. 2) by engagement with the axle pushes the piston rod 47 and piston 45 away from the axle if there is any eccentricity; but the slide 60 is held by friction where it has previously been pushed, unless the eccentricity of the axle exceeds the predetermined allowable amount. If the axle is so eccentric that it contacts the roller 82 (FIG. 2) as the axle rotates, the limit switch 71 is tripped. This signifies that the axle is beyond the high limit for reclamation. The tripping of the limit switch can be used to automatically close a signal to indicate that the axle should be rejected.

The tripping of limit switch 71 closes a circuit to the relay coil 137, closing the relay arms 137a, 137d and 137g associated with this relay coil and opening the relay arms 137b, 137c, 137e, 137f and 137h associated with this coil. The opening of relay arm 137h stops inching motor 171. Opening of relay arm 137c deenergizes solenoid 153; and closing of relay arm 137d energizes solenoid 155. This shifts valve 138 back to the position shown in FIG. 8, causing the probe-template carrier to be swung back from probing to tracing position. The opening of relay arm 137e deenergizes solenoid 161. This causes valve 129 to be shifted back to the position shown in FIG. 8. This causes the eccentricity probe 82 (FIG. 2) to be retracted. The opening of relay arm 137f deenergizes solenoid 163; and the closing of relay arm 137g energizes solenoid 165. This causes the probes and templates to be retracted longitudinally so that they do not remain in their adjusted positions but are reset to their zero positions. The opening of relay arm 137b deenergizes the timer 139.

The unchucking and unloading of the axle from the machine are then effected in the same way and by the same mechanism as described in the prior application above mentioned.

In the event the limit switch 71 is not contacted before the timer 139 times out, that is, if the eccentricity is within acceptable limits, then contact of stud 72 with limit switch 70 will stop the spindle drive motor 171. The contacting of limit switch 70 signifies that the axle is acceptable; and since the limit switch 70 is tripped at the low point on the surface of the axle, the axle will be stopped, then, with it positioned in the lathe so that probing for metal removal will be done where the radial distance of axle eccentricity is the least. This assures that the tools will be set by the probes to take off stock, even from the lowest point in the surface of the axle. Thus, the axle can be turned during one tool pass. Subsequent timing out of timer 139 will cause timer 139a to close. Since limit switch 70 is already closed, a circuit will be made then to relay coil 141. This will close relay arms 141a and 141d but open relay arms 141b, 141c, and 141f.

Opening of relay arm 141f stops the motor 171. Closing of relay arm 141d energizes solenoid 165; and opening of relay arm 141c deenergizes solenoid 163. This causes valve 164 to be shifted back to the position shown in FIG. 9, causing the probes and templates to be retracted longitudinally as described above. Opening of relay arm 141b deenergizes solenoid 161. This retracts the eccentricity probe 82. Closing of relay arm 141a completes the circuit to timer 143, which again may be of conventional construction.

When timer 143 times out, timer arm 143a is closed. This completes a circuit to relay coil 145, and also energizes timer 147, which again may be a conventional timer of any suitable construction. This timer, like the other timers, is adjustable and may be set to run for any desired time period.

Energizing of relay coil 145 closes relay arms 145a and 145d and opens relay arms 145b, 145c, and 145e. Closing of relay arm 145a makes a circuit to timer 149 which again may be a conventional timer of any suitable construction. Opening of relay arm 145b deenergizes solenoid 159, causing valve 160 to be shifted back to the position shown in FIG. 8. This releases the latch that holds the probe which gauges the journal diameter as described in the prior application above mentioned. Opening of relay arm 145c deenergizes solenoid 165; and closing of relay arm 145d energizes solenoid 167. This shifts valve 172 (FIG. 9) to put the left hand ends of cylinders 212 and 214 on supply from compressed air line 202 through ducts 216 and 218 and to put the right hand ends of these cylinders on exhaust through ducts 220 and 222 and port 224. Port 226 exhausts when the valve 172 is in the position shown in FIG. 9.

The shifting of the pistons 174 and 176 in the cylinders 212 and 214 expands the probes transversely to gauge the dust collar and wheel seat diameters 87 and 84 (FIG. 7) of the axle.

When the timer 147 times out, the timer arm 147a closes. This establishes a circuit to solenoid 163, causing shift of valve 164 (FIG. 9) to put pressure on the left hand sides of pistons 166, 168 and 170 to expand the probes for the journal, dust collar and wheel seat portions 86, 87 and 84, respectively, of the axle to engage the several shoulders or fillets connected with these portions of the axle as described in the prior application above-mentioned.

When the timer 149 is energized it closes relay arm 149a which maintains the circuit to this timer after relay arm 145a opens.

When timer 149 times out, timer arm 149b opens deenergizing solenoid 157. This will cause the valve 158 to be shifted by spring pressure back to the position shown in FIG. 8, putting hydraulic pressure on the right hand side of piston 160. This will cause the templates to be clamped in the positions to which they have been moved with the probes during the longitudinal and transverse expansions of the probes as described in the prior application above mentioned.

When the pressure or clamping piston 160 has built up enough it will trip the pressure-operated switch 230 as described in said prior application. This will complete a circuit to relay coil 151. This will open the associated relay arms 151a, 151c, 151d, 151e, and 151f and close the associated relay arms 151b. Opening of relay arm 151a will deenergize solenoid 153, and closing of relay arm 151b will energize solenoid 155. This will cause valve 138 to be shifted back to the position shown in FIG. 8 causing the support 40 for the probe and template carriers to be swung back to tracing position. Opening of relay arms 151c and 151d will deenergize solenoids 163 and 165, but the probes and templates will remain in their longitudinally expanded positions since it requires energization of solenoid 165 to shift valve 164 back to the position shown in FIG. 9. Opening of relay arms 151e and 151f will deenergize solenoids 167 and 169 allowing the probes and templates to remain in their transverse positions. Hence the templates with the swinging back of support 40 (FIG. 2) to tracing position are in proper position to guide the tracer to control the shape of and the amount of stock to be removed from the axle A. When the support reaches tracing position it will trip a limit switch that will start the tracing and machining cycle of the machine as described in the prior application above-mentioned.

From the preceding description it will be seen, then, that, when the apparatus of the present invention is employed, the probes are swung down into operative relation with the axle, and the probes are expanded longitudinally to move them longitudinally of the axle into position to engage the several shoulders or fillets formed at the end of the axle and at the junctures of the journal and dust guard portion, of the dust guard portion and the wheel seat portion, and of the wheel seat portion and the main body of the axle, respectively. Simultaneously the latch for holding the probes and templates in correct radial position according to the diameter of the journal portion of the axle, which is to be machined, is cocked. Then the eccentricity probe is moved by spring pressure into operative position relative to the axle; and the inching motor and a timer are started to rotate the axle. The timer allows sufficient time for the eccentricity probe to set itself to its low point; and then the timer times out, but in doing so energizes a second timer. If the axle is eccentric enough to trip the limit switch 71 during the rotation of the axle before the second timer times out, then the inching motor is stopped, the eccentricity probe is retracted; the probes and their connected templates are collapsed longitudinally; and the probe-template support is swung to tracing position. The axle is then dechucked and discharged from the machine, rejected. If the limit switch 71 is not contacted before the second timer times out, a third timer is energized and the work spindle, carrying the axle, continues to rotate until the limit switch 70 is tripped. The inching motor is then stopped; the templates are collapsed longitudinally; and the eccentricity probe is retracted, but the support 40 remains in probing position. When the third timer times out, a fourth timer is energized and the probe, which gauges the diameter of the journal portion of the axle, is released to effect this gauging operation as in the machine of the previously mentioned application. The probes of this prior machine are then expanded transversely to gauge the dust collar and wheel seat diameters and thereby position the associated templates radially of the axle as described in said copending prior application.

A fifth timer is also energized. When the fourth timer times out, the probes are extended longitudinally of the axle to cause them to engage the shoulders of the axle thereby setting the templates longitudinally—as described in said copending prior application. When the fifth timer times out the templates, which are now correctly adjusted as a result of the engagement of the probes with the respective parts of the axle, are clamped in adjusted positions under hydraulic pressure as in the machine of the prior application. When this clamping pressure builds up enough, the support 40 for the probes and templates is swung back to tracing position; and the tracing cycle commences, as in the machine of the prior application, to control the machining operation on the axle.

While the invention has been described in connection with a specific embodiment thereof, it will be understood that it is capable of further modification, and this application is intended to cover any variations, uses, or adaptations of the invention following, in general, the principles of the invention and including such departures from the present disclosures as come within known or customary practice in the art to which the invention pertains and as may be applied to the essential features hereinbefore set forth, and as fall within the scope of the invention or the limits of the appended claims.

Having thus described our invention, what we claim is:

1. In a machine for machining a rotary workpiece such as an axle or the like and having
  (a) a rotary work support for supporting a workpiece, and
  (b) means for rotating said work support to effect rotation of the workpiece,
  (c) a movable support,
  (d) a test member movably mounted on said movable support,
  (e) means for moving said movable support toward and from the workpiece to move said test member into and out of operative relation, respectively, with the workpiece, said movement of said movable support toward the workpiece bringing said test member into position to be engaged and moved by said workpiece as it rotates if the eccentricity of the workpiece exceeds a predetermined amount,
  (f) timing means for controlling the time of rotation of the work support, and for stopping the rotation of the work support after a predetermined time has expired, and
  (g) means positioned to be actuated by said test member upon movement thereof by the workpiece during rotation of the workpiece if the eccentricity of the workpiece exceeds said predetermined amount, to effect movement of said movable support away from operative relation with the workpiece to permit removal of the workpiece from the machine.

2. In a machine for machining a rotary workpiece such as an axle or the like and having
  (a) a rotary work support for supporting a workpiece, and
  (b) means for rotating said work support to effect rotation of the workpiece,
  (c) a movable support,
  (d) a test member movably mounted on said movable support,
  (e) means for moving said movable support toward and from the workpiece to move said test member into and out of operative relation, respectively, with the workpiece, said movement of said movable support toward the workpiece bringing said test member into position to be engaged and moved by said workpiece as it rotates,
  (f) control means positioned to be operated by said test member upon movement thereof by said workpiece if the eccentricity of the workpiece exceeds a predetermined amount,
  (g) timing means for controlling the time of rotation of said work support during engagement thereof by said test member,
  (h) means actuated upon actuation of said control means for stopping rotation of said work support and upon timing out of said timing means for effecting movement of said movable support away from operative relation with the workpiece,
  (j) means for effecting machining operations upon a workpiece, and
  (k) means operative to actuate the last-named means to effect the machining operations if said control means has not been actuated before said timing means times out.

3. In a machine for machining a rotary workpiece such as an axle or the like and having
  (a) a rotary work support for supporting a workpiece, and
  (b) means for rotating said work support to effect rotation of the workpiece,
  (c) a movable support,
  (d) a test member movably mounted on said movable support,
  (e) means for moving said movable support toward and from the workpiece to move said test member into and out of operative relation, respectively, with the workpiece,
  (f) means for moving said test member into position to engage the workpiece as the workpiece rotates when said movable support is moved toward the workpiece,
  (g) first timing means for controlling the time of rotation of the work support to permit said test member to move fully into engagement with the workpiece before timing out,
  (h) second timing means for permitting further rotation of said work support,
  (i) control means operative by said test member for stopping rotation of said work support and moving said movable support away from the workpiece to permit removal of the workpiece from the machine if the eccentricity of the workpiece exceeds a predetermined amount.

4. In a machine as claimed in claim 3,
  (a) a third timing means, and
  (b) means for moving said movable support away from the workpiece when said third timing means times out.

5. In a machine for machining a rotary workpiece such as an axle as claimed in claim 3,
  (a) a third timing means,
  (b) means for effecting machining of the workpiece, and
  (c) means for retracting said test member and for actuating said machining means if said indicating means does not indicate before timing out of said second timing means that the eccentricity of the workpiece exceeds said predetermined amount.

6. In a machine for machining a rotary workpiece such as an axle or the like and having
  (a) a rotary work support for supporting a workpiece,
  (b) means for rotating said work support to effect rotation of the workpiece,
  (c) means for effecting machining of the workpiece,
  (d) a swingable support,
  (e) movable templates carried by said swingable support for controlling the machining means,
  (f) movable probes carried by said swingable support for effecting setting of said templates,
  (g) means for swinging said swingable support into and away from operative relation with the workpiece, and
  (h) means for moving said probes into engagement with the workpiece to set said templates when said movable support is in operative relation with the workpiece,
  (i) an eccentricity probe carried by said swingable support and movable independently thereof, (j) means for moving said eccentricity probe into engagement with the rotating work support when said swingable support is in operative relation with the workpiece, and (k) means operated by said eccentricity probe for indicating if the eccentricity of the workpiece exceeds a predetermined amount.

7. In a machine as claimed in claim 6, (a) means for effecting swinging of said swingable support away from operative relation with the workpiece and stopping rotation of the workpiece if the eccentricity of the workpiece exceeds said predetermined amount.

8. In a machine as claimed in claim 6, wherein the means for indicating the eccentricity of the workpiece is actuated upon movement of said eccentricity probe by the workpiece more than a predetermined distance.

9. In a machine for machining a rotary workpiece such as an axle or the like, and having (a) a rotary work support for supporting a workpiece, and (b) means for rotating said work support to effect rotation of the workpiece, (c) means for testing the workpiece for eccentricity comprising (d) a support movable toward and from the workpiece, (e) a probe movably mounted upon said movable support, (f) means for resiliently urging said probe into engagement with the workpiece when the movable support is moved toward the workpiece, said probe being movable against the resistance of said resilient means if the workpiece is eccentric of the axis of rotation of said work support, and (g) means actuated by said probe if the probe movement exceeds a predetermined amount to cause movement of said movable support away from the workpiece, and (h) means for stopping the means for rotating said work support when said movable support is moved away from the workpiece.

10. In a machine for machining a rotary workpiece such as an axle or the like and having (a) a rotary work support for supporting the workpiece, (b) means for rotating said work support to effect rotation of the workpiece and (c) means for machining a workpiece, (d) means for testing the workpiece for eccentricity comprising (e) a support movable toward and from the workpiece, (f) a probe movably mounted upon said movable support, (g) means for resiliently urging said probe into engagement with the workpiece when the movable support is moved toward the workpiece, said probe being movable against the resistance of said resilient means if the workpiece is eccentric of the axis of rotation of said work support, (h) a first limit switch positioned to be tripped if said probe is moved by the workpiece in a predetermined time period beyond a predetermined distance, (i) a second limit switch positioned to be tripped if said probe is not moved beyond said predetermined distance in said time period, (j) means actuated upon tripping of said first limit switch for moving said movable support away from the workpiece and for stopping rotation of said work support to permit removal of the workpiece from sad work support, and (k) means for moving said movable support away from the workpiece and effecting operation of said machining means upon tripping of said second limit switch.

11. In a machine for machining a rotary workpiece such as an axle or the like, and having (a) a rotary work support for supporting the workpiece, (b) means for rotating said work support to effect rotation of the workpiece, and (c) means for machining a workpiece, (d) means for testing the workpiece for eccentricity comprising (e) a support movable toward and from the workpiece, (f) a probe movably mounted upon said movable support, (g) means for resiliently urging said probe into engagement with workpiece when the movable support is moved toward the workpiece, said probe being movable against the resistance of said resilient means if the workpiece is eccentric of the axis of rotation of said work support, (h) means actuated by said probe when moved beyond a predetermined distance due to the eccentricity of the workpiece for moving said movable support away from the workpiece and for stopping rotating of said work support to permit removal of the workpiece from said work support, and (i) means for moving said movable support away from the workpiece and effecting operation of said machining means when said probe is moved by the workpiece less than said predetermined distance.

12. In a machine for machining a rotary workpiece such as an axle or the like, and having (a) a rotary work support for supporting the workpiece, and (b) means for rotating said work support to effect rotation of the workpiece, (c) means for testing the workpiece for eccentricity comprising (d) a support movable toward and from the workpiece, (e) a probe movably mounted upon said movable support, (f) means for using said probe into engagement with the workpiece when the movable support is moved toward the workpiece, said probe being movable by the workpiece against the resistance of the last-named means if the workpiece is eccentric of the axis of rotation of said work support, and (g) means for stopping rotation of the work support when said probe engages the least eccentric point on the workpiece if the eccentricity of the workpiece does not exceed a predetermined limit, so that tools for machining the workpiece may be set with the workpiece in its stopped position.

13. In a machine as claimed in claim 12, means for stopping the rotation of said work support if the eccentricity of the workpiece exceeds said predetermined limit so that the workpiece may be unloaded from the machine.

14. In a machine for machining a rotary workpiece such as an axle or the like, and having (a) a rotary work support for supporting a workpiece coaxially thereof, (b) means for rotating said work support to effect rotation of the workpiece, and (c) means for machining the rotating workpiece, (d) means for testing the workpiece for eccentricity prior to the machining operation comprising (e) a movable member positionable to be engaged and moved by the workpiece as it rotates, (f) timing means governing the time of rotation of the workpiece during testing of its eccentricity, (g) means positioned to be actuated by said movable member during said time if the eccentricity of the workpiece exceeds a predetermined amount and for thereupon moving said movable member out of engagement with the workpiece to permit removal of the workpiece from the machine, and (h) means positioned to be actuated by said movable member during said time if the eccentricity of the workpiece is no greater than said predetermined amount to effect operation of said machining means.

15. In a machine for machining a rotary workpiece such as an axle or the like and having (a) a rotary work support for supporting a workpiece coaxially thereof, (b) means for rotating said work support to effect rotation of the workpiece, (c) means for machining the workpiece, (d) a movable support, (e) movable templates carried by said movable support for controlling the machining means, (f) movable probes carried by said movable support for engaging the workpiece to effect setting of said templates.

(g) means for moving said movable support into and away from operative relation with the workpiece, (h) means for moving said probes into engagement with the workpiece to set said templates when said movable support is in operative relation with the workpiece, (i) an eccentricity probe carried by said movable support to be moved into engagement with the workpiece upon movement of said movable support in the direction of operative relation with the workpiece, said eccentricity probe being mounted on said movable support to be movable independently thereof by the rotating workpiece if said workpiece is eccentric of the axis of rotation of said work support, (j) timing means controlling rotation of the work support and permitting rotation of the work support for a limited period during engagement of the work support by said eccentricity probe, (k) means positioned to be operated by said eccentricity probe if the eccentricity of the workpiece exceeds a predetermined amount to stop rotation of said work support and move said movable support out of operative relation with the workpiece to permit removal of the workpiece from the machine, and (l) means positioned to be operated by said eccentricity probe if the eccentricity of the workpiece is no greater than said predetermined amount to retract said eccentricity probe and effect operation of the first-named movable probes and of the machining means.

16. A machine as claimed in claim 15 wherein the eccentricity is movable on said work support in one direction to effect operation of the second last-named means, and is movable on said work support in the opposite direction to effect operation of the last-named means.

References Cited by the Examiner
UNITED STATES PATENTS

| | | | |
|---|---|---|---|
| 496,272 | 4/93 | Miebach | 82—34 X |
| 915,671 | 3/09 | Hanson | 82—34.1 |
| 1,765,624 | 6/30 | Scusa | 82—34 X |
| 2,583,253 | 1/52 | Carder | 82—45 X |
| 2,632,956 | 3/53 | Crosby | 82—34 |
| 2,809,044 | 10/57 | Landreth | 82—45 X |
| 3,056,319 | 10/62 | Thielenhaus | 82—45 X |

WILLIAM W. DYER, JR., *Primary Examiner.*